United States Patent
Kaneko

(10) Patent No.: US 7,206,562 B2
(45) Date of Patent: Apr. 17, 2007

(54) CROSS POLARIZED WAVE INTERFERENCE ELIMINATING SYSTEM AND METHOD

(75) Inventor: Ichiro Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 201 days.

(21) Appl. No.: 10/509,966

(22) PCT Filed: Mar. 12, 2003

(86) PCT No.: PCT/JP03/02924

§ 371 (c)(1),
(2), (4) Date: Oct. 4, 2004

(87) PCT Pub. No.: WO03/085868

PCT Pub. Date: Oct. 16, 2003

(65) Prior Publication Data

US 2005/0163271 A1 Jul. 28, 2005

(30) Foreign Application Priority Data

Apr. 5, 2002 (JP) ............................. 2002-104062

(51) Int. Cl.
*H04B 1/10* (2006.01)
(52) U.S. Cl. .................. 455/295; 455/296; 455/63.1; 455/63.11; 375/346
(58) Field of Classification Search ............... 455/63.1, 455/67.11, 67.13, 67.15, 70, 295, 296; 375/346
See application file for complete search history.

(56) References Cited

U.S. PATENT DOCUMENTS 5,479,443 A * 12/1995 Kagami et al. ............. 375/211

FOREIGN PATENT DOCUMENTS

| JP | 362186627 A | * | 8/1987 |
| JP | 63-272238 A | | 11/1988 |
| JP | 02-081528 A | | 3/1990 |
| JP | 02-164149 A | | 6/1990 |
| JP | 03-218137 A | | 9/1991 |
| JP | 04-025223 A | | 1/1992 |
| JP | 04-137934 A | | 5/1992 |
| JP | 2002-077094 A | | 3/2002 |

* cited by examiner

Primary Examiner—Matthew Anderson
Assistant Examiner—Tuan Pham
(74) Attorney, Agent, or Firm—Sughrue Mion, PLLC

(57) ABSTRACT

Coefficient controllers (68, 78) control weighting coefficients for tapped transversal filters used in interference compensators (67, 77) on the basis of transmission power control information from reception determination devices (66, 78) on the V polarization side and H polarization side. The interference compensators (67, 77) control the normal compensation ranges of the interference compensators (67, 77) and adjust interference compensation amounts on the basis of the weighting coefficients from the coefficient controllers (68, 78).

6 Claims, 6 Drawing Sheets

COEFFICIENT CONVERSION TABLE
(WEIGHTING COEFFICIENT)

| | | DIFFERENT POLARIZATION POWER | | |
|---|---|---|---|---|
| | | LARGE | MEDIUM (STANDARD) | SMALL |
| SELF-POLARIZATION POWER | LARGE | 1 | 1/2 | 1/2 |
| | MEDIUM (STANDARD) | 2 | 1 | 1/2 |
| | SMALL | 2 | 2 | 1 |

COEFFICIENT CONTROL BASED ON SELF-POLARIZATION
POWER/DIFFERENT POLARIZATION POWER

CROSS POLARIZED WAVE INTERFERENCE ELIMINATING SYSTEM AND METHOD

BACKGROUND OF THE INVENTION

The present invention relates to a cross polarized wave interference eliminating system and method and, more particularly, to a cross polarized wave interference eliminating system and method which eliminate cross polarized wave interference caused on the receiving side in microwave communication.

When the microwave communication lines of two routes are formed by using a vertically polarized wave (V-polarized wave) and horizontally polarized wave (H-polarized wave), which are orthogonal to each other, between stations, cross polarized wave interference occurs on the receiving side due to the influences of fading and the like. In order to eliminate such cross polarized wave interference, the receiving side notifies the transmitting side of transmission power control information in accordance with the reception state, and the transmitting side controls the transmission power of V- and H-polarized waves on the basis of the transmission power control information.

FIGS. 7 and 8 show a conventional cross polarized wave interference eliminating system. FIG. 7 shows the transmitting side. FIG. 8 shows the receiving side.

In this cross polarized wave interference eliminating system, first of all, reception determination devices 81 and 82 respectively detect reductions in the reception power of V- and H-polarized waves. Assume that when the reception determination devices 81 and 82 exchange signals, it is found that the reception power of a V- or H-polarized wave has decreased. In this case, in order to simultaneously control the transmission power of both V- and H-polarized waves, transmission power control information is notified through one of (or both of) a route formed by a transmitter 65, transmission/reception duplexer 51, antenna 52, antenna 32, transmission/reception duplexer 31, and a receiver 15 and a route formed by a transmitter 75, the transmission/reception duplexer 51, the antenna 52, the antenna 32, the transmission/reception duplexer 31, and a receiver 25, thereby simultaneously controlling the power of V- and H-polarized waves by simultaneously controlling transmission power controllers 41 and 42.

In such a conventional cross polarized wave interference eliminating system, however, since the transmission power of V- and H-polarized waves is controlled at the same time, it is impossible to obtain interference compensation characteristics optimal for cross polarized wave interference. Assume that one of the levels of V- and H-polarized waves increases, because transmission power control information is not used for cross polarized wave interference elimination, and the cross polarized wave interference amount increases while the cross polarized wave identification degree of an antenna has decreased. In this case, the compensation amount of an interference compensator is saturated, and hence the system cannot sufficiently exhibit its performance. In addition, even if it is required to increase the transmission power of one of polarized waves, control must be performed to increase the transmission power of both polarized waves, resulting in an increase in the power consumption of the apparatus.

In contrast, the powers of V- and H-polarized waves may be independently controlled. If, however, power control is simply performed for each polarized wave, the apparatus may operate in a direction to increase its own cross polarized wave interference amount owing to the execution of transmission power control.

SUMMARY OF THE INVENTION

The present invention has been made to solve the above problems, and has as its object to provide a cross polarized wave interference eliminating system which when independently performing transmission power control for each cross polarized wave, can obtain optimal interference compensation characteristics for cross polarized wave interference without requiring addition of a large amount of hardware.

In order to achieve the above object, according to the present invention, there is provided a cross polarized wave interference eliminating system comprising means, on a receiving side, which includes interference compensators which generate interference compensation signals for respectively compensating for two orthogonal cross polarized components, generates transmission power control information for each polarized wave to individually improve an interference compensation characteristic for each polarized wave in accordance with an interference state, and notifies a transmitting side of the information, comprising interference compensation amount adjusting means for, on the receiving side, adjusting an interference compensation amount of a self-polarized wave on the basis of the transmission power control information for each of the polarized waves.

In this case, the interference compensation amount adjusting means may comprise a coefficient controller which generates and outputs, on the basis of the transmission power control information for each of the polarized waves, a weighting coefficient corresponding to a cross polarized wave interference amount which can occur in accordance with a reception level difference between the two polarized waves, and an interference compensator which filters a reception output on a different polarization side with a specific frequency component, and outputs a compensation signal having a level corresponding to a weighting coefficient from the coefficient controller and a phase opposite to an interference component.

In addition, the interference compensator may include a transversal filter which filters a reception output on the different polarization side on the basis of a tap coefficient corresponding to a cross polarized wave interference amount, and a weighting circuit which adjusts a level of a compensation signal output from the transversal filter by increasing/decreasing a value of the tap coefficient in accordance with the weighting coefficient.

Alternatively, the interference compensator may include a filter which filters a reception output on the different polarization side with a specific frequency component, and a weighting circuit which adjusts a level of a compensation signal output from the filter by increasing/decreasing an output from the filter on the basis of the weighting coefficient.

DETAILED DESCRIPTION OF EMBODIMENT

[Arrangement of Cross Polarized Wave Interference Eliminating System]

Figure 1:
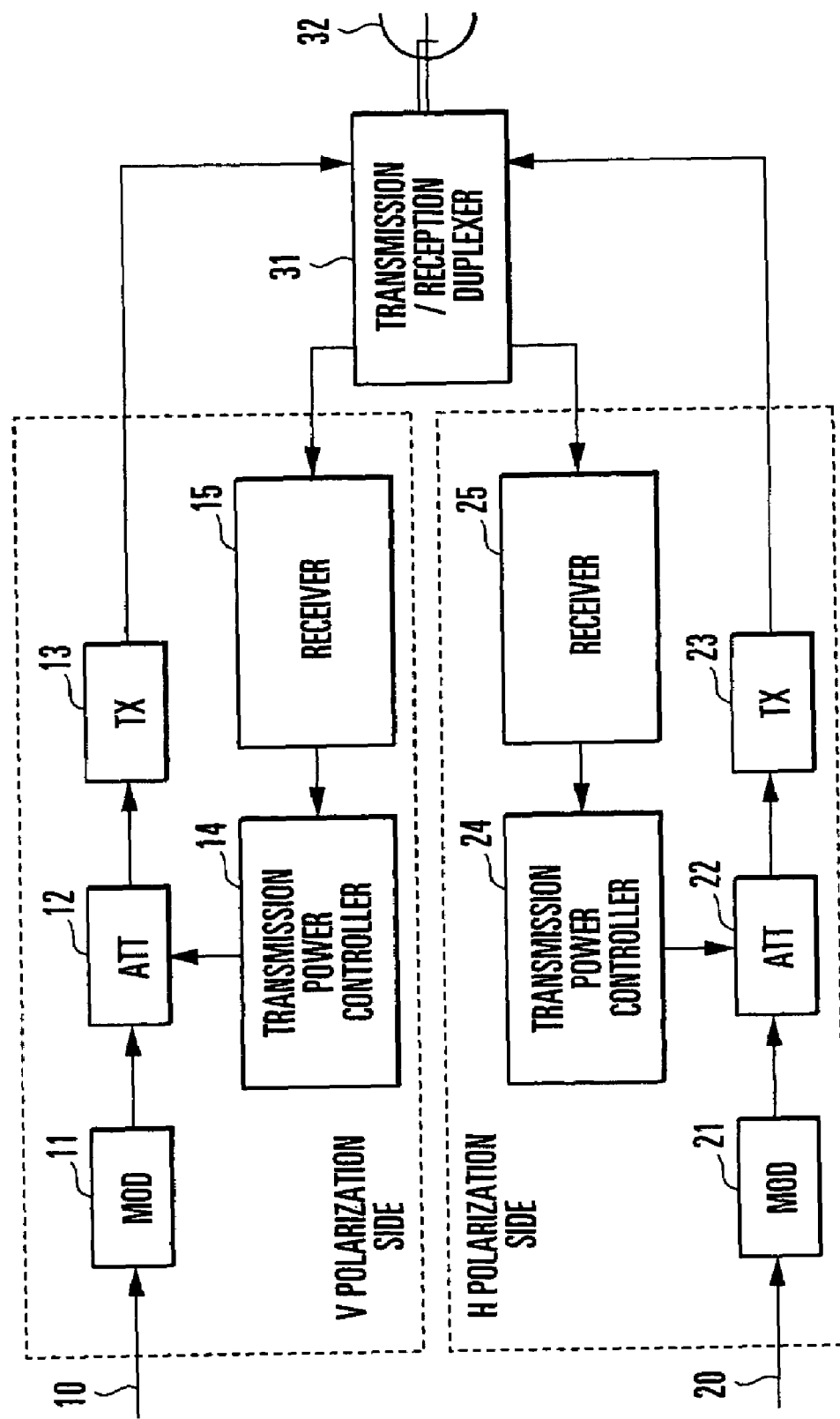
FIG. 1 is a block diagram showing the arrangement (on the transmitting side) of a cross polarized wave interference eliminating system according to an embodiment of the present invention.
Figure 2:
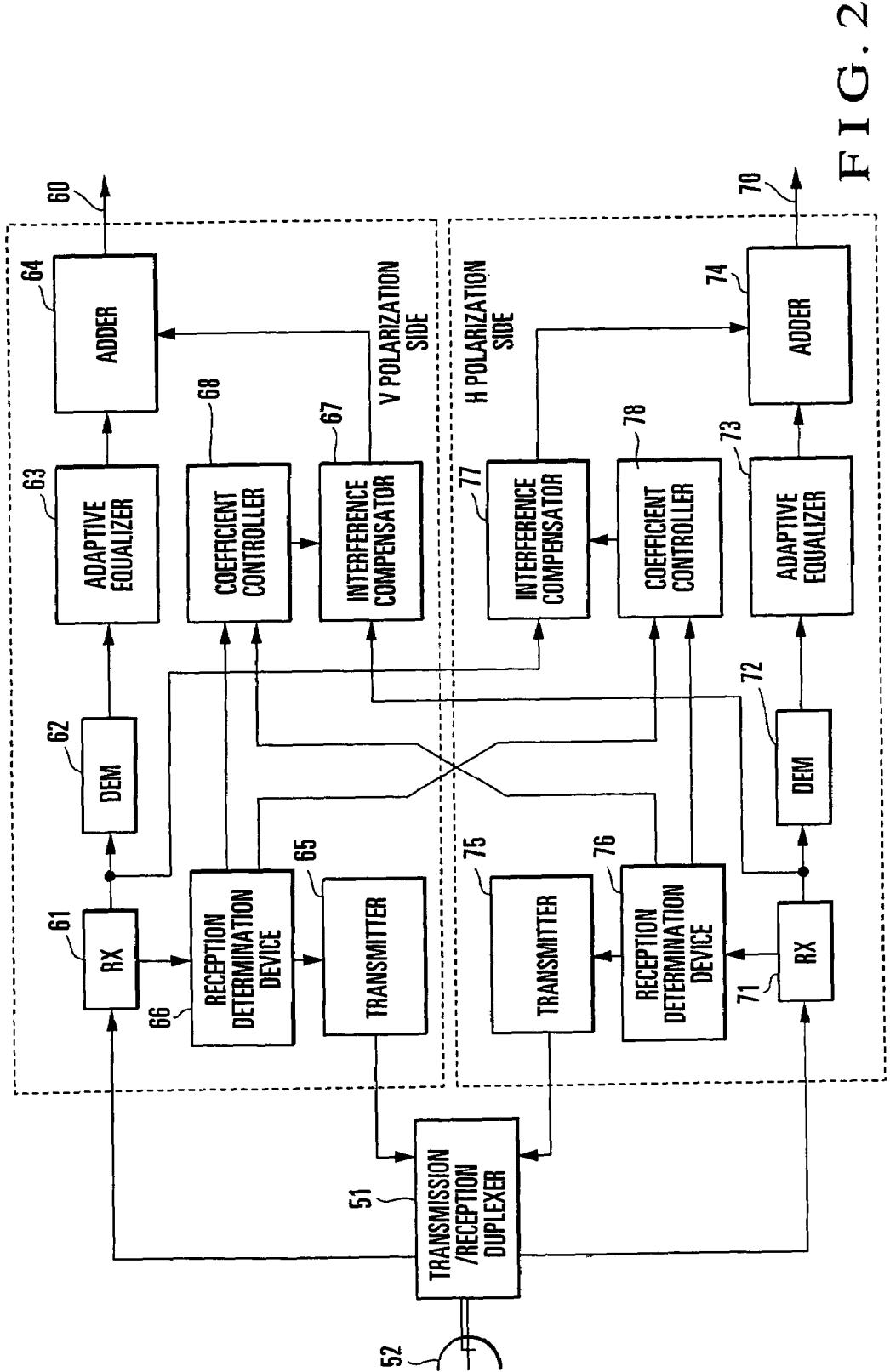
FIG. 2 is a block diagram showing the arrangement (on the receiving side) of the cross polarized wave interference eliminating system according to the embodiment of the present invention.

The arrangement of a cross polarized wave interference eliminating system according to an embodiment of the present invention will be described with reference FIGS. 1 and 2. FIGS. 1 and 2 are block diagrams showing the arrangement of the cross polarized wave interference eliminating system according to an embodiment of the present invention. FIG. 1 shows the transmitting side. FIG. 2 shows the receiving side.

Figure 7:
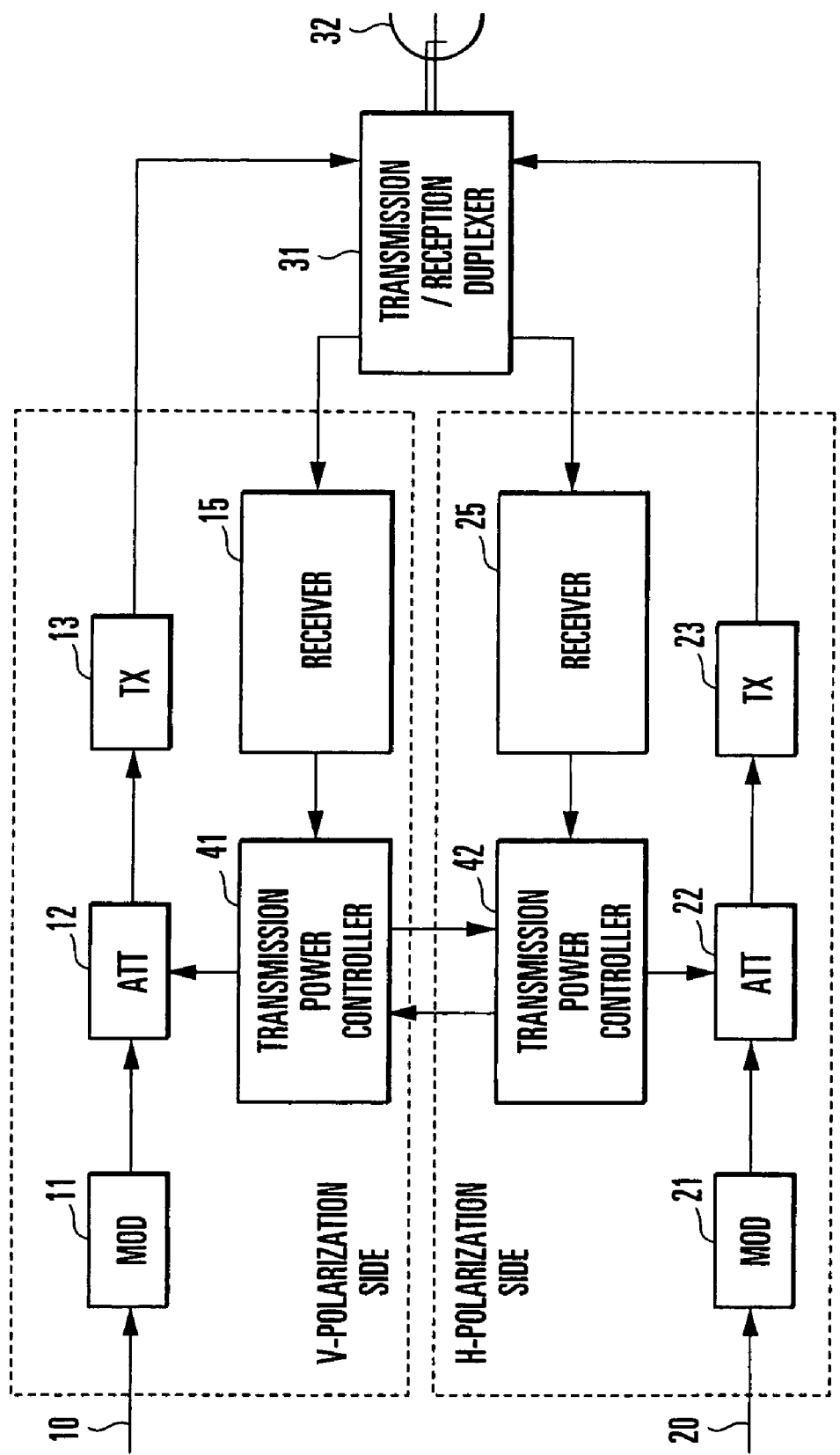
FIG. 7 is a block diagram showing the arrangement (on the transmitting side) of a conventional cross polarized wave interference eliminating system.
Figure 8:
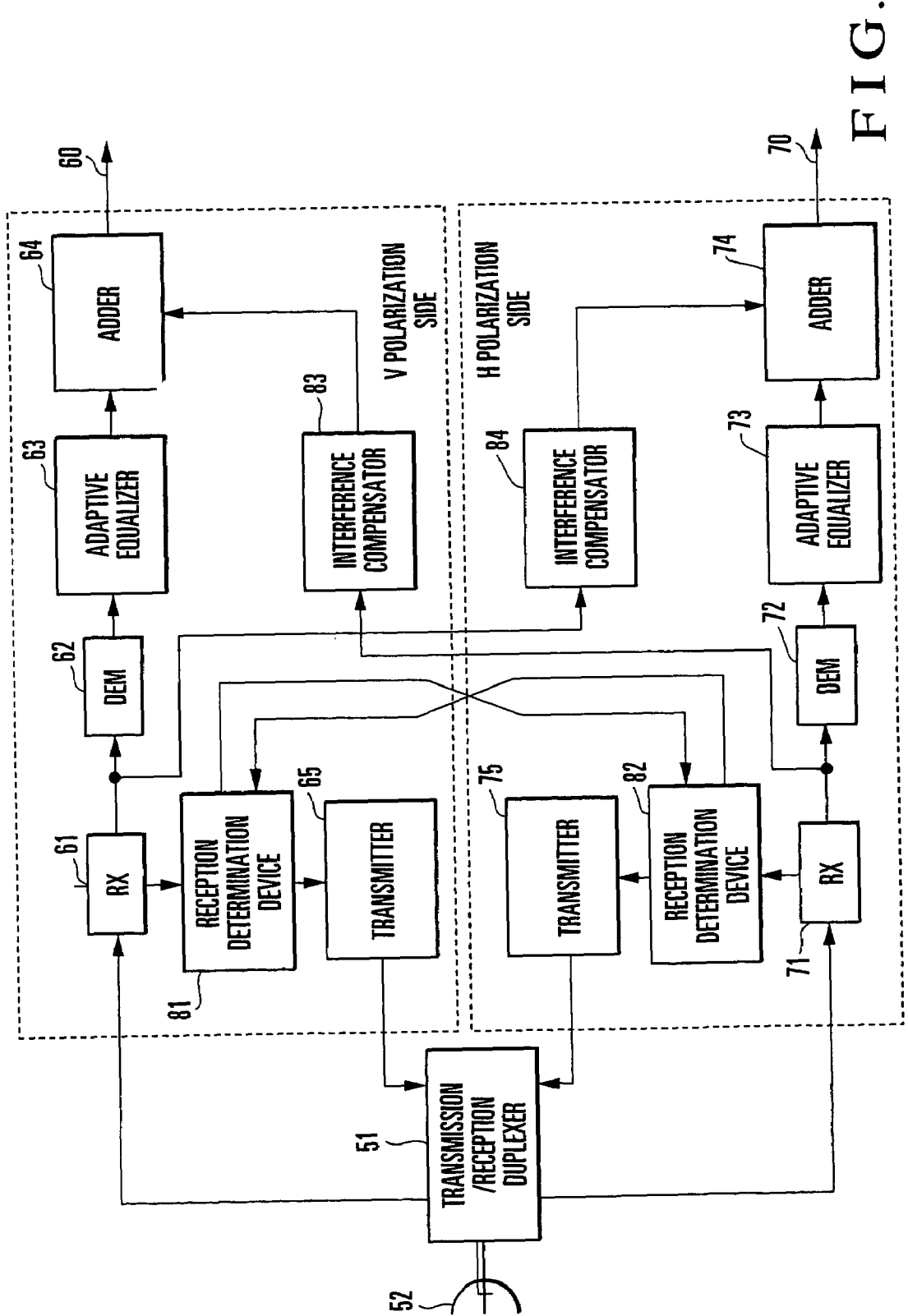
FIG. 8 is a block diagram showing the arrangement (on the receiving side) of the conventional cross polarized wave interference eliminating system.

This cross polarized wave interference eliminating system performs microwave communication through two routes by using orthogonal vertically polarized wave (V-polarized wave) and horizontally polarized wave (H-polarized wave). Note that the same reference numerals as in FIGS. 7 and 8 denote the same parts in FIGS. 1 and 2.

Referring to FIG. 1, on the transmitting side, components on the V polarization side include a modulator (MOD) 11, variable attenuator (ATT) 12, transmitter (TX) 13, transmission power controller 14, and receiver 15. Components on the H polarization side include a modulator (MOD) 21, variable attenuator (ATT) 22, transmitter (TX) 23, transmission power controller 24, and receiver 25. A transmission/reception duplexer 31 and antenna 32 are provided as components to be shared by the V polarization wave side and H polarization side.

The modulators 11 and 21 modulate a V-polarized input baseband signal 10 and H-polarized input baseband signal 20, respectively. The variable attenuators 12 and 22 control the output levels of the modulators 11 and 21, respectively. The transmitters 13 and 23 respectively convert outputs from the variable attenuators 12 and 22 into signals with predetermined transmission frequencies, and output them as a V-polarized wave and H-polarized wave. The transmission/reception duplexer 31 transmits the V- and H-polarized transmission signals from the transmitters 13 and 23 to the opposite station (receiving side) through the antenna 32. The transmission/reception duplexer 31 also receives a signal from the opposite station through the antenna 32 and separates it. Each of the receivers 15 and 25 demodulates transmission power control information from the opposite station (receiving side) from the signal separated by the transmission/reception duplexer 31. The transmission power controllers 14 and 24 respectively control the transmission levels of V- and H-polarized waves by controlling the variable attenuators 12 and 22 on the basis of the demodulated transmission power control information.

Referring to FIG. 2, a transmission/reception duplexer 51 and antenna 52 are provided as components to be shared by the V polarization side and H polarization side. Components on the V polarization side include receiver (RX) 61, demodulator (DEM) 62, adaptive equalizer 63, adder 64, transmitter 65, reception determination device 66, interference compensator 67, and coefficient controller 68. Components on the H polarization side include a receiver (RX) 71, demodulator (DEM) 72, adaptive equalizer 73, adder 74, transmitter 75, reception determination device 76, interference compensator 77, and coefficient controller 78.

The transmission/reception duplexer 51 receives a signal from an opposite station (transmitting side) through the antenna 52 and separates it. The transmission/reception duplexer 51 also sends out signals (transmission power control information) from the transmitters 65 and 75 to the opposite station (transmitting side) through the antenna 52. The receivers 61 and 71 convert V- and H-polarized reception signals separated/output from the transmission/reception duplexer 51 into medium-frequency signals. The demodulators 62 and 72 demodulate outputs from the receivers 61 and 71 and output the resultant signals. The adaptive equalizers 63 and 73 eliminate distortion components on the propagation paths from the outputs from the demodulators 62 and 72. The interference compensators 67 and 77 filter the outputs from the receivers 71 and 61 with specific frequency components on the basis of weighting coefficients from the coefficient controllers 68 and 78, and output compensation signals with the same levels as those of interference components and opposite phases thereto. The adders 64 and 74 eliminate the cross polarized wave interference components by adding the interference compensation signals generated by the interference compensators 67 and 77 to the output signals from the adaptive equalizers 63 and 73, and output the resultant signals as a V-polarized demodulated baseband signal 60 and H-polarized demodulated baseband signal 70, respectively. The reception determination devices 66 and 76 perform determination by comparing the reception levels detected by the receivers 61 and 71 with predetermined threshold levels (thresholds), and output transmission power control information for instructing to increase/decrease the transmitting side power on the basis of the determination results. The transmitters 65 and 76 send out the transmission power control information output from the reception determination devices 66 and 76 to the opposite station (transmitting side) through the transmission/reception duplexer 51 and antenna 52. The coefficient controllers 68 and 78 generate weighting coefficients to be output to the interference compensators 67 and 77 on the basis of the transmission power control information obtained from both the reception determination devices 66 and 76, and output them. The coefficient controllers 68 and 78 and the interference compensators 67 and 77 constitute an interference compensation amount adjusting means.

[Operation of Cross Polarized Wave Interference Eliminating System]

The operation of the cross polarized wave interference eliminating system according to this embodiment will be described next with reference to FIGS. 1 and 2. On the transmitting side (see FIG. 1), the modulators 11 and 21 perform modulation, e.g., quadrature multilevel modulation, of the input baseband signals 10 and 20, and convert them into signals in the medium frequency band. These signals then pass through the variable attenuators 12 and 22 and converted into signals in the radio frequency band by the transmitters 13 and 23. After the signals pass through the transmission/reception duplexer 31, the signals are transmitted as V- and H-polarized radio outputs from the antenna 32.

On the receiving side (see FIG. 2), the V- and H-polarized components are received by the antenna 52, and then are separated into V- and H-polarized reception signals by the transmission/reception duplexer 51. These signals are amplified by the receivers 61 and 71 and converted into signals in the medium frequency band. The outputs from the receivers 61 and 71 are input to the demodulators 62 and 72, which perform digital determination of the reception signals. The resultant signals are input to the adaptive equalizers 63 and 73, which in turn eliminate the distortion components on the propagation paths. The adders 64 and 74 eliminate cross polarized wave interference components, and output the resultant signals as the demodulated baseband signals 60 and 70.

Operation for transmission power control will be described next. The receivers 61 and 71 on the receiving side detect the reception levels of reception signals. The reception determination devices 66 and 76 compare the detected signals with specific threshold levels, and generate control signals for increasing or decreasing the power on the transmitting side. The transmitters 65 and 75 modulate the control signals to sent out them to a radio zone, and transmit the signals for controlling the transmission powers from the antenna 52 through the transmission/reception duplexer 51. The signals received by the antenna 32 on the transmitting side are input to the receivers 15 and 25 for V polarization and H polarization through the transmission/reception duplexer 31, which in turn send out the control signals to the transmission power controllers 14 and 24. The transmission power controllers 14 and 24 change the attenuation amounts of the variable attenuators 12 and 22 on the transmitting side, on the basis of the signal contents of transmission power control which are received by the transmission power controllers 14 and 24, thereby performing transmission power control operation.

Cross polarized wave interference compensation operation will be described next. The signals received by the receivers 61 and 71 on the receiving side are sent out, as reference signals for transmission power interference compensation, to not only the self-polarization (reception signal) side but also the different polarization side. The interference compensators 77 and 67 on the different polarization side filter the reference signals with specific frequency components to generate compensation signals with the same levels as those of interference components and opposite phases thereto. The adders 64 and 74 add the compensation signals to main signal components. As a consequence, the interference components contained in the main signal components are canceled by the compensation signals to obtain signals without any cross polarized wave interference components. In this case, the coefficient controllers 68 and 78 control weighting coefficients for tapped transversal filters used in the interference compensators 67 and 77 on the basis of the transmission power control information from the reception determination devices 66 and 76 on the V polarization side and H polarization side. The interference compensators 67 and 77 control the normal compensation ranges of the interference compensators 67 and 77 on the basis of the weighting coefficients from the coefficient controllers 68 and 78, thereby adjusting interference compensation amounts.

As described above, according to this embodiment, in transmission power control, the coefficient controllers 68 and 78 control weighting coefficients in accordance with the cross polarized wave interference amounts that can occur when V- and H-polarized waves differ in reception level. The interference compensators 67 and 77 then adjust interference compensation amounts on the basis of the weighting coefficients. This makes it possible to obtain optimal interference compensation characteristics for cross polarized wave interference when power control is independently performed for each of V- and H-polarized waves. In addition, this operation requires only relatively small-size hardware, namely the interference compensation amount adjusting means obtained by addition of the coefficient controllers 68 and 78 and slight modifications to the interference compensators 67 and 77. When transmission power control is to be independently performed by cross polarization, such control can be realized without requiring significant addition of hardware.

Consider problems in practical applications. Transmission using cross polarization is the simplest method of independently performing transmission power control for V and H polarization, in consideration of the fact that the above system has many applications of double-polarization transmission as an additional system for an existing system and can be easily added to existing hardware. According to the conventional cross polarized wave interference eliminating system (see FIGS. 7 and 8), transmission power control for V polarization and that for H polarization need to be linked to each other so as to be simultaneously operated for V and H polarization, and hardware for V polarization and that for H polarization must be designed such that they can operate in cooperation with each other. In contrast to this, according to this embodiment, by only using transmission power control information, independent transmission power control for V and H polarization can be used without saturation of cross polarized wave interference ability.

[Example of Operation of Cross Polarized Wave Interference Eliminating System]

An example of the operation of the cross polarized wave interference eliminating system will be described next. Assume that there is a difference in attenuation amount between V- and H-polarized waves in space propagation due to the influence of rainfall attenuation or the like. In general, it is confirmed that the attenuation amount of a V-polarized wave is larger than that of an H-polarized wave at the time of rainfall attenuation. On the receiving side, the receiver 61 for V polarization detects a reception level, and sends out a signal indicating a decrease in reception level to the reception determination device 66, and sends out transmission power control information to the transmitter 65 to increase the transmission power on the V polarization side. This notifies the variable attenuator 12 of the signal for changing the attenuation amount through the transmission/reception duplexer 51, antennas 52 and 32, receiver 15, and transmission power controller 14.

At this time, the coefficient controller 68 receives a control signal representing a "decrease" in reception level, i.e., a signal for "increasing" the transmission power, from the reception determination device 66 on the V polarization side. In addition, the coefficient controller 68 receives a control signal representing reception level "standard", i.e., a signal for setting the transmission power to "medium", from the demodulator 76 on the H polarization side. The coefficient controllers 68 and 78 include coefficient conversion tables (conversion function), similar to the one shown in FIG. 3, which control coefficients in accordance with the inputs of the reception determination devices 66 and 76. For example, in this case, the coefficient controller 68 on the V polarization side sets a weighting coefficient of "½" in accordance with an input result indicating that a V-polarized wave (self-polarized wave) is "large", and an H-polarized wave (different polarized wave) is "medium". The coefficient controller 78 on the H polarization side performs coefficient control to set a weighting coefficient of "2" from an input result indicating that an H-polarized wave (self-polarized wave) is "medium" and a V-polarized wave (different polarized wave) is "large".

Figures 3, 4:
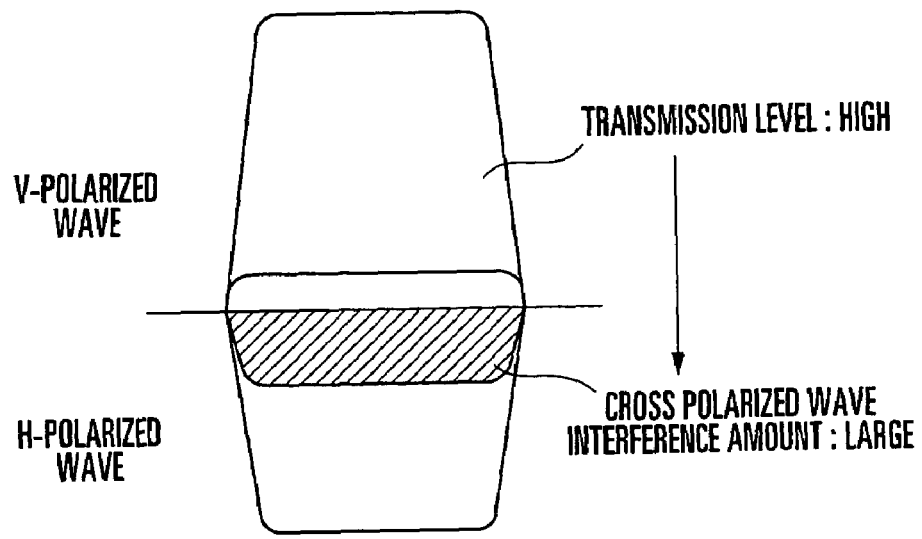
FIG. 3 is a view showing an example of a coefficient conversion table for a coefficient controller.
FIG. 4 is a view for explaining V-polarized/H-polarized wave spectra and interference component.

As shown in FIG. 4, when the level of a V-polarized wave is high and the level of an H-polarized wave is standard, the cross polarized wave interference amount on the H polarization side inevitably increases to cause a deterioration, and that on the V polarization side decreases to result in an improvement. In this manner, this system operates to perform interference compensation control in accordance with variations in interference amount. Coefficient control by the coefficient controllers 68 and 78 can be easily realized by setting the tap coefficient of each tap of a tapped transversal filter as a known technique to "2" (shifting by one bit to the left in binary computation) or "½" (shifting by one bit to the right in binary computation).

With this operation, when the coefficient controller 68 for H polarization sets a coefficient of "2", the interference compensator 67 has a compensation range twice as large as that in the normal case. As a consequence, the absolute value of the compensation amount for cross polarized wave interference increases. When the coefficient controller 78 for V polarization sets a coefficient of "½", the interference compensator 77 has a compensation range ½ that in the normal case. In this case, the coefficient controller 78 decreases the absolute range of compensation amount to a necessary and sufficient range and performs elaborate control within the range. For the sake of simplicity, both the input and output sides of each of the coefficient controllers for V and H polarization are indicated by ternary control ranges (input: "large", "medium", and "small"; output: "2", "1", and "½"). However, coefficient control can be performed in finer steps, on the basis of transmission power control information in finer steps, by using output results of a plurality of bits for address inputs of a plurality of bits using a conversion table such as a ROM.

Figure 5:
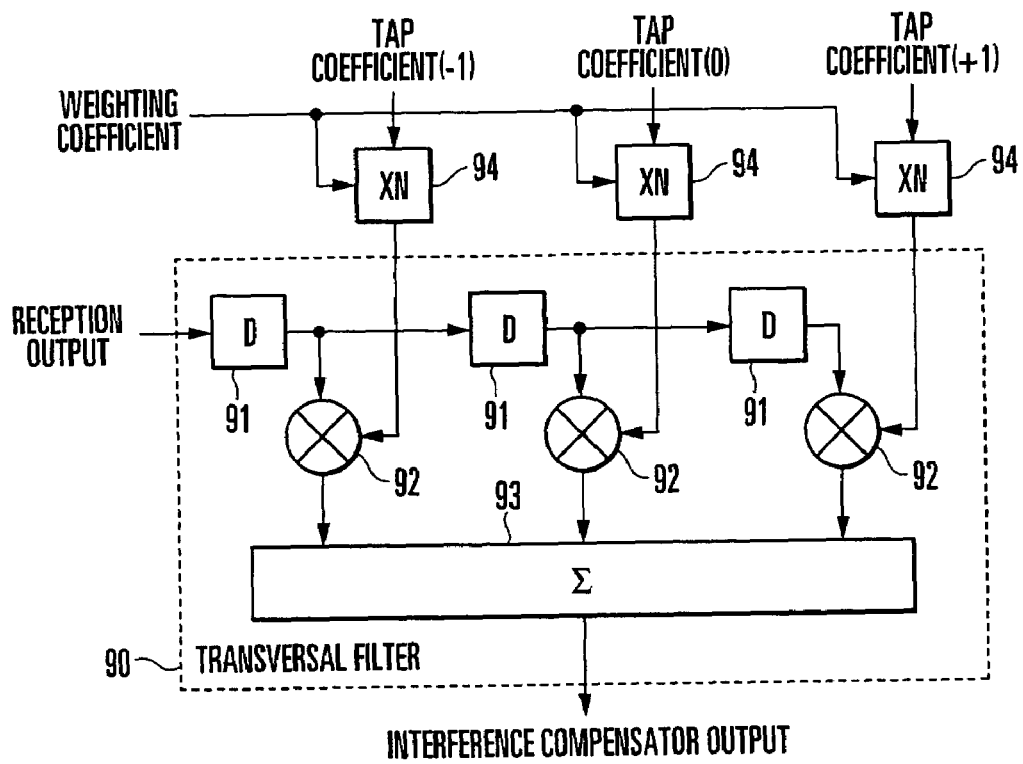
FIG. 5 is a view showing an example of the arrangement of an interference compensator.

FIG. 5 shows the actual arrangement of each of the interference compensators 67 and 77. Each of the interference compensators 67 and 77 is comprised of a transversal filter 90 including delay circuits (D) 91 which sequentially delay reception outputs from a corresponding one of the receivers 61 and 71, multipliers 92 which multiply tap outputs from the delay circuits 91 by the tap coefficients generated in a corresponding one of the interference compensators 67 and 77, and a combining circuit 93 which combines outputs from the respective multipliers 92, and weighting circuits 94 which control the respective tap coefficients, on the basis of weighting coefficients (×N) from the coefficient controller 68, by using a bit shift circuit and the like. The weighting circuits 94 uniformly increase/decrease the respective tap coefficients on the basis of the weighting coefficients from the coefficient controllers 68 and 78 to properly control the interference compensation ranges of the interference compensators 67 and 77, thereby adjusting interference compensation amounts to optimal values. Note that a transversal filter with a plurality of taps is a known technique, and hence a detailed description thereof will be omitted.

Figure 6:
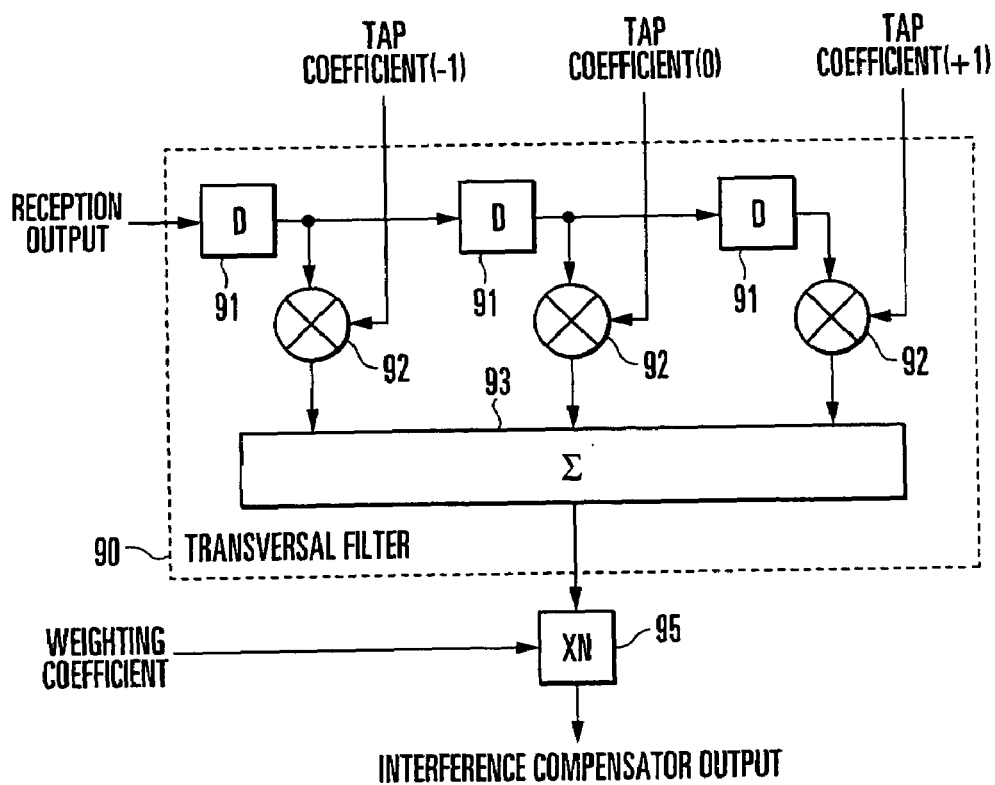
FIG. 6 is a view showing another example of the arrangement of the interference compensator.

FIG. 6 shows another example of the arrangement of each of the interference compensators 67 and 77. Referring to FIG. 5, weighting control on tap coefficients is performed inside the interference compensators 67 and 77 by using weighting coefficients (×N) from the coefficient controllers 68 and 78. In this case, however, a weighting circuit 95 is provided on the output stage of the transversal filter 90 to increase/decrease the interference compensation output from the combining circuit 93 in accordance with weighting coefficients from the coefficient controllers 68 and 78. With this operation, the interference compensator outputs are compressed or decompressed to properly control the interference compensation ranges, thereby adjusting interference compensation amounts to optimal values. According to this arrangement, since there is no need to change a coefficient for each tap coefficient, the circuit size can be reduced when the number of taps of a filter is large.

The invention claimed is:

1. A cross polarized wave interference eliminating system comprising:
   means, on a receiving side comprising:
   interference compensators which generate interference compensation signals for respectively compensating for cross polarized wave interference components of two orthogonal polarized waves components, for generating transmission power control information for each of the polarized waves, where the transmission power control information controls a transmission power of a transmitting side that is an opposite station of the receiving side, to individually improve an interference compensation characteristic for each of the polarized waves in accordance with an interference state, and for notifying the transmitting side of the information; and
   interference compensation amount adjusting means for, on the receiving side, adjusting an interference compensation amount of a self polarized wave on the basis of the transmission power control information for each of the polarized waves.

2. A cross polarized wave interference eliminating system according to claim 1, wherein the interference compensation amount adjusting means comprises a coefficient controller which generates and outputs, on the basis of the transmission power control information for each of the polarized waves, a weighting coefficient corresponding to a cross polarized wave interference amount which can occur in accordance with a reception level difference between the two polarized waves, and an interference compensator which filters a reception output on a different polarization side with a specific frequency component, and outputs a compensation signal having a level corresponding to a weighting coefficient from said coefficient controller and a phase opposite to an interference component.

3. A cross polarized wave interference eliminating system according to claim 2, wherein the interference compensator comprises a transversal filter which filters a reception output on the different polarization side on the basis of a tap coefficient corresponding to a cross polarized wave interference amount, and a weighting circuit which adjusts a level of a compensation signal output from said transversal filter by increasing/decreasing a value of the tap coefficient in accordance with the weighting coefficient.

4. A cross polarized wave interference eliminating system according to claim 2, wherein the interference compensator comprises a filter which filters a reception output on the different polarization side with a specific frequency component, and a weighting circuit which adjusts a level of a compensation signal output from said filter by increasing/decreasing an output from said filter on the basis of the weighting coefficient.

5. A cross polarized wave interference eliminating method used in a cross polarized wave interference eliminating system comprising means, on a receiving side, comprising interference compensators which generate interference compensation signals for respectively compensating for cross polarized wave interference components of two orthogonal polarized waves components, for generating transmission power control information for each of the polarized waves, where the transmission power control information controls a transmission power of a transmitting side that is an opposite station of the receiving side, to individually improve an interference compensation characteristic for each of the polarized waves in accordance with an interference state, and for notifying the transmitting side of the information, the method comprises:

on the reception side, adjusting an interference compensation amount of a self polarized wave on the basis of the transmission power control information for each of the polarized waves.

6. A cross polarized wave interference eliminating method according to claim 5, wherein the adjusting further comprises:

generating, on the basis of the transmission power control information for each of the polarized waves, a weighting coefficient corresponding to a cross polarized wave interference amount which may occur in accordance with a reception level difference between the two polarized waves;

filtering a reception output on a different polarization side with a specific frequency component;

and outputting a compensation signal having a level corresponding to the weighting coefficient and a phase opposite to an interference component.

* * * * *